United States Patent [19]

Kalinovski

[11] 3,944,135
[45] Mar. 16, 1976

[54] CONDITION RESPONSIVE VALVE CONSTRUCTION AND METHOD OF MAKING THE SAME

[75] Inventor: Fred Kalinovski, King of Prussia, Pa.

[73] Assignee: Robertshaw Controls Company, Richmond, Va.

[22] Filed: July 12, 1974

[21] Appl. No.: 487,908

[52] U.S. Cl. .................. 236/102; 236/87; 137/82; 251/78; 236/99 G
[51] Int. Cl.² ........................................ G05D 23/02
[58] Field of Search .......... 236/102, 87, 99 G, 99 F; 137/82; 251/234, 78

[56] References Cited
UNITED STATES PATENTS

| | | | |
|---|---|---|---|
| 1,491,189 | 4/1924 | Birtch | 236/102 |
| 2,757,688 | 8/1956 | Klingler | 251/78 |
| 3,104,813 | 9/1963 | Baatrup | 236/102 |
| 3,166,247 | 1/1965 | Malone et al. | 236/102 |
| 3,215,162 | 11/1965 | Carver | 137/625.44 |
| 3,237,633 | 3/1966 | Sanville | 137/82 |
| 3,297,044 | 1/1967 | Thorburn | 137/82 |
| 3,329,393 | 7/1967 | Parks | 251/78 |
| 3,580,502 | 5/1971 | Duchek | 137/82 |

Primary Examiner—John J. Camby
Assistant Examiner—Henry C. Yuen
Attorney, Agent, or Firm—Candor, Candor & Tassone

[57] ABSTRACT

A condition responsive valve construction having a housing provided with a valve seat. A pair of metallic balls are secured together in abutting relation and are movable toward and away from the valve seat so that one of the balls acts to open and close the valve seat. A lever is movably mounted in the housing and acts between the balls to cause movement thereof upon certain movement of the lever caused by a condition responsive means sensing different conditions. Spring means are provided for tending to hold the balls in the valve seat closed position thereof and in a certain valve seat open position thereof so that the lever can have lost motion travel between the balls for creating a differential in the conditions required to open and close the valve seat.

26 Claims, 6 Drawing Figures

CONDITION RESPONSIVE VALVE CONSTRUCTION AND METHOD OF MAKING THE SAME

This invention relates to an improved condition responsive valve construction as well as to an improved method of making such a valve construction or the like.

It is a feature of this invention to provide a temperature actuated, pneumatic thermostat for use in automobile emission control systems wherein it is desired to vent a control pressure at approximately 1500°F and restore that pressure at approximately 1100°F whereby means must be provided for permitting such a differential in the operating conditions thereof.

Accordingly, it was found according to the teachings of this invention that such a condition responsive valve construction could be provided and be formed from a housing means having a valve seat therein. A pair of balls can be secured together in abutting relation and be movable toward and away from the valve seat so that one of the balls acts to open and close the valve seat. A lever can be movably mounted in the housing means and act between the balls to cause movement thereof upon certain movements of the lever. A condition responsive means can be carried by the housing means and be operatively associated with the lever to cause movement thereof upon conditions sensed thereby, the lever having lost motion travel between the balls for creating a differential in the conditions required to open and close the valve seat. Holding means can be provided for tending to hold the balls in the valve seat closed position thereof and in a certain valve seat open position thereof to thereby permit the lost motion travel of the lever between the interconnected balls.

Accordingly, it is a feature of this invention to provide an improved condition responsive valve construction having one or more of the novel features set forth above or hereinafter shown or described.

Another object of this invention is to provide an improved method of making such a condition responsive valve construction or the like.

Other objects, uses and advantages of this invention are apparent from a reading of this description, which proceeds with reference to the accompanying drawings forming a part thereof and wherein.

Figure 1:
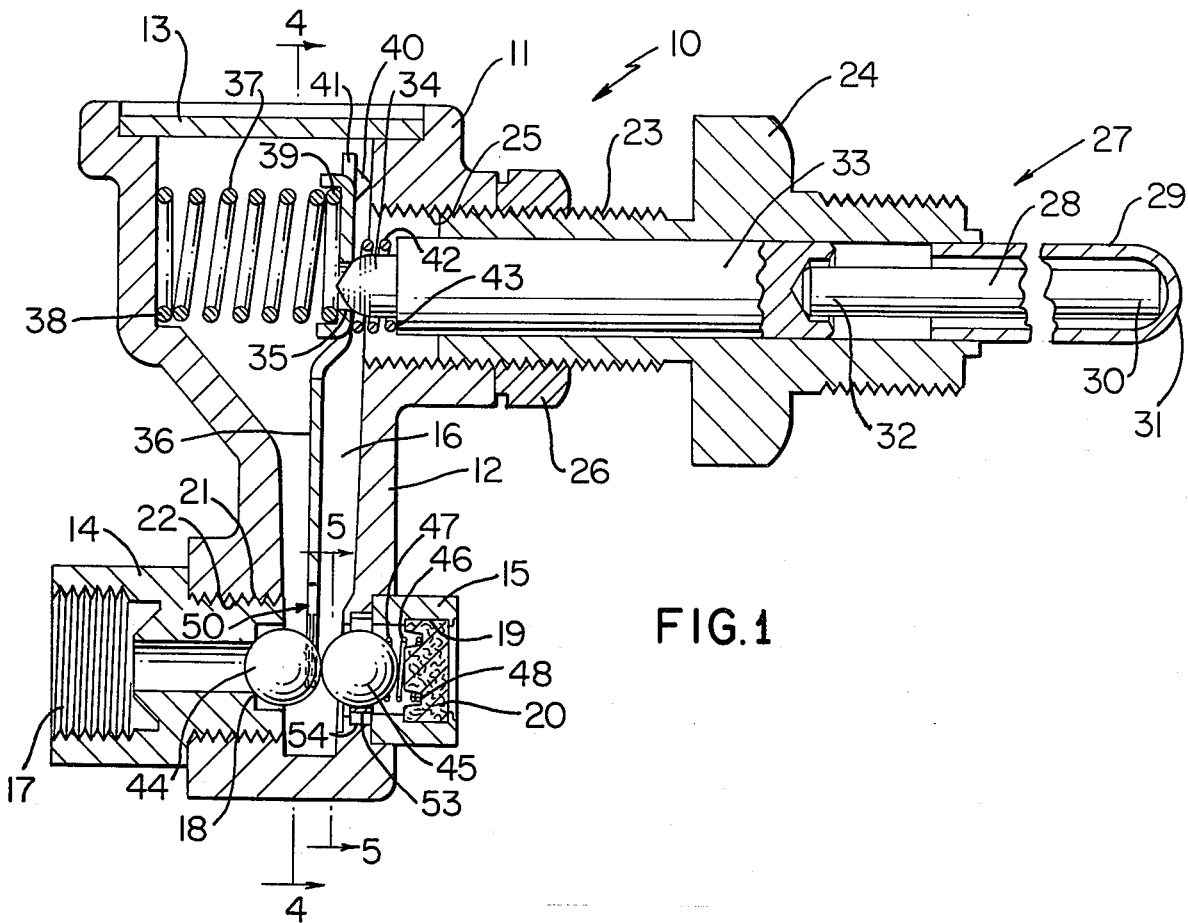
FIG. 1 is a cross-sectional view of the improved condition responsive valve construction of this invention with the valve seat being in a closed condition thereof.

While the various features of this invention are hereinafter described and illustrated as being particularly adapted to provide a valve construction that can be utilized in the auto industry for controlling an automobile emission control system, it is to be understood that the various features of this invention can be utilized singly or in any combination thereof to provide valve control means for other systems as desired.

Therefore, this invention is not to be limited to only the embodiments illustrated in the drawings, because the drawings are merely utilized to illustrate one of the wide variety of uses of this invention.

Figure 2:
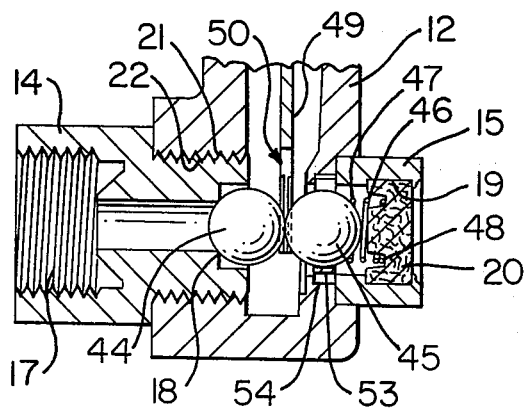
FIG. 2 is a fragmentary view similar to FIG. 1 and illustrates the lost motion travel of the lever means of the valve construction.
Figure 3:
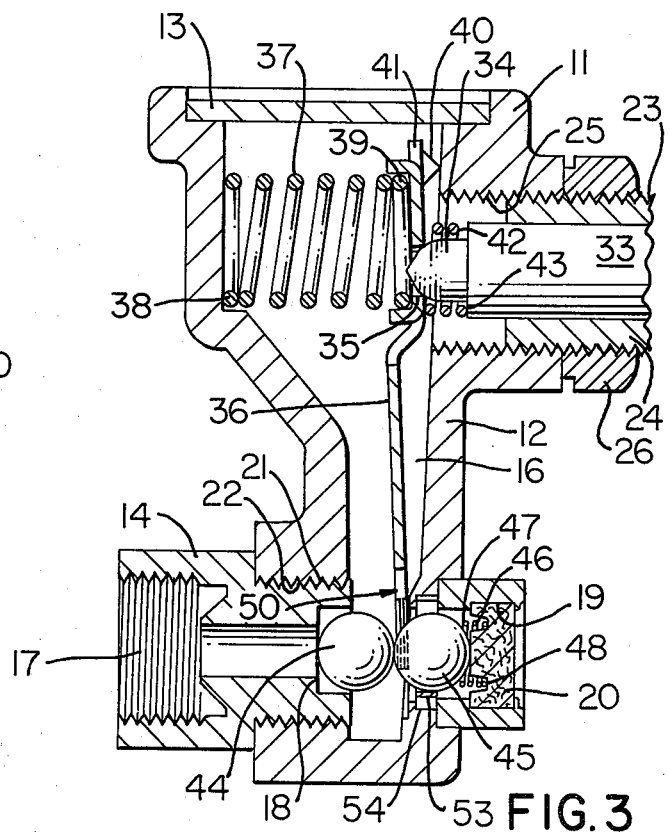
FIG. 3 is a view similar to FIG. 1 and illustrates the valve construction with the valve seat in an open condition thereof.
Figure 4:
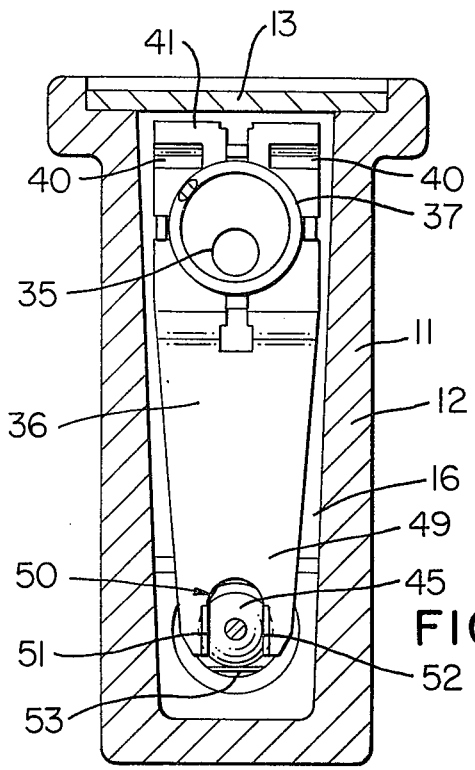
FIG. 4 is a cross-sectional view taken on line 4—4 of FIG. 1.

Referring now to FIGS. 1, 2 and 3, the improved condition responsive valve construction of this invention is generally indicated by the reference numeral 10 and comprises a housing means 11 formed from a plurality of parts 12, 13, 14 and 15 suitably secured together to define an internal chamber 16 in the housing means 11 having an inlet 17 leading to the chamber 16 through a valve seat 18 and an outlet 19 leading from the chamber 16 and having suitable filter means 20 disposed therein.

The housing part 14 can have an externally threaded end 21 threadedly disposed in a threaded bore 22 formed in the housing part 12 as illustrated whereby the housing part 14 carries the valve seat 18 integral therewith.

Similarly, an externally threaded part 23 of a fitting 24 can be threadedly disposed in a threaded bore 25 of the housing part 12 and be secured thereto by a locknut means 26, the fitting 24 forming part of a condition responsive means that is generally indicated by the reference numeral 27 and comprising a rod 28 and tube 29 formed in a conventional rod and tube manner wherein the tube 29 has a relatively high coefficient of thermal expansion while the rod 28 has a relatively low coefficient of thermal expansion. The rod 28 has one end 30 bearing against a closed end 31 of the tube 29 and an opposed end 32 abutting against a sliding actuator 33 having a reduced conical end 34 projecting into an opening 35 formed in a lever 36 disposed within the chamber 16 and normally urged toward the actuator 33 by a compression spring 37 disposed in the chamber 16 and having one end 38 bearing against the housing part 12 and another end 39 bearing against the lever 36. The reduced conical end 34 of the sliding actuator 33 is actually spherical where it contacts opening 35 of the lever 36 but should the end 34 of the actuator leave contact with the lever when the sensed temperature is 1600°F or above as will be apparent hereinafter, the conical tip part of the end 34 helping the actuator 33 to reengage the opening 35 of the lever 36 after the rod and tube arrangement 27 has been subjected to temperatures above approximately 1600°F, the temperature which causes the actuator 33 and lever 36 to separate as will be apparent hereinafter.

The lever 36 has a projection means 40 on one end 41 thereof which bears against the housing part 12 to pivotally mount the lever 36 in the chamber 16, a small compression spring 42 being disposed about the conical projection 34 of the actuator 33 to bear against a shoulder 43 of the actuator 33 and the end 41 of the lever 36 to tend to maintain the actuator 33 in contact with the end 32 of the rod 28 at the temperature which causes the end 34 of the actuator 33 to separate from the lever 36 above 1600°F as will be apparent hereinafter.

A pair of steel balls 44 and 45 are welded or otherwise secured together in abutting relation as illustrated in FIG. 1 whereby the balls 44 and 45 move in unison. The balls 44 and 45 are arranged in the chamber 16 in such a manner that a compression spring 46 has one end 47 abutting against the ball 45 to tend to move the balls 44 and 45 to the left in FIG. 1 and thereby cause the ball 44 to close the valve seat 18, the other end 48 of the spring 46 bearing against the filter 20 in the housing part 15. Thus, the spring 46 tends to maintain the valve seat 18 in a closed position by urging the balls 44 and 45 in their valve seat closing direction.

The lower end 49 of the lever 36 has a slot means 50 passing therethrough and defines a pair of opposed side edges 51 and 52 of the lever 36 which are reduced in cross-sectional thickness as illustrated in the drawings so that the edges 51 and 52 are disposed between the balls 44 and 45 as illustrated in FIGS. 1–3 when the slot 50 straddles the balls 44 and 45 during assembly therewith.

In this manner, the end 49 of the lever 36 is free to travel from the position illustrated in FIG. 1 wherein the side edges 51 and 52 are engaging against the ball 44 to the position illustrated in FIG. 2 wherein the edges 51 and 52 are out of contact with both balls 44 and 45 until the lever 36 pivots to the right to have the edges 51 and 52 contact against the ball 45 and cause movement of the balls 44 and 45 away from the valve seat 18 in opposition to the force of the compression spring 46 as will be apparent hereinafter. Thus, there is space for a lost motion travel of the end 49 of the lever 36 between engagement of one of the balls 44 or 45 to engagement with the other ball 45 or 44 as the case may be to provide for a differential in the operation of the condition responsive valve construction 10 for a purpose hereinafter described.

Figure 5:
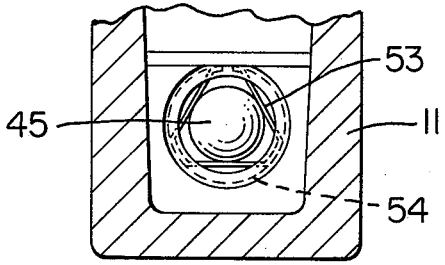
FIG. 5 is a cross-sectional view taken substantially on line 5—5 of FIG. 1.
Figure 6:
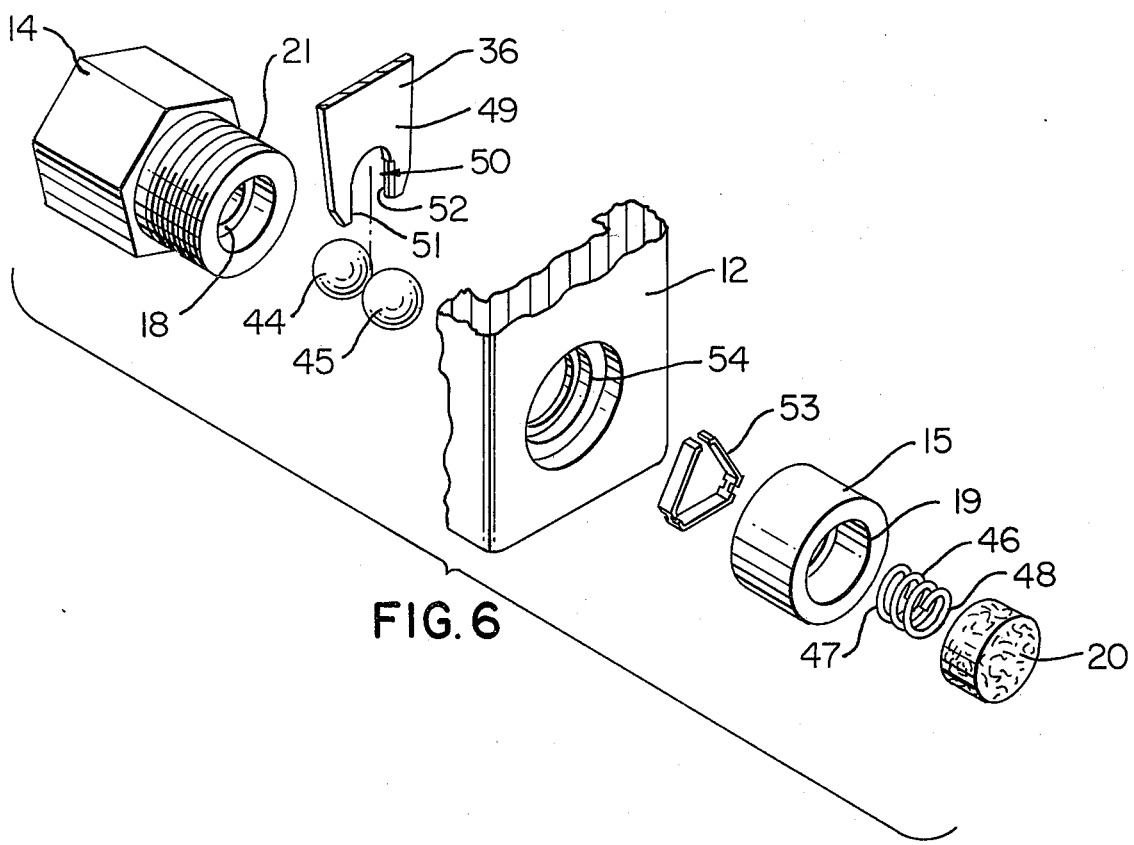
FIG. 6 is an exploded perspective view of certain parts of the valve construction of FIG. 1.

A spring member 53, formed in a substantially triangular configuration as illustrated in FIGS. 5 and 6, is received in an annular recess 54 formed in the housing part 12 and disposed adjacent the housing part 15 as illustrated in FIG. 5 so as to be trapped in the recess 54 and require the ball 45 to move in the triangular configuration thereof as the ball 45 is moved from the position illustrated in FIG. 1 to the position illustrated in FIG. 3 for a purpose hereinafter described. Thus, the spring member 53 acts radially on the ball 45 to tend to hold the balls 44 and 45 by friction in their valve seat closing position as illustrated in FIG. 1, in the full valve seat open position as illustrated in FIG. 3 or any position intermediate their fully opened and closed positions for a purpose hereinafter described.

Therefore, it can be seen that the valve construction 10 of this invention can be made from a relatively few parts in a simple manner to operate in a manner now to be described.

As previously stated, it is desired that the condition responsive valve construction 10 of this invention, when being utilized for an automobile emission control system, be adapted to vent a control pressure at the inlet 17 when the temperature reaches approximately 1500°F and then restore that control pressure when the temperature drops to approximately 1100°F whereby the valve seat 18 of the control device 10 of this invention must be opened by the rod and tube arrangement 27 when the same senses a temperature of approximately 1500°F and such rod and tube arrangement 27 must cause closure of that valve seat 18 when the rod and tube arrangement 27 senses that the temperature is at approximately 1100°F.

Accordingly, the rod and tube arrangement 27 is so calibrated that when the same is sensing a temperature below 1500°F, the tube 29 is only elongated to a certain distance relative to the rod 28 to maintain the lever 36 with its end 49 either completely against the ball 44 or somewhere intermediate the balls 44 and 45 such as illustrated in FIG. 2. However, when the temperature reaches approximately 1500°F, the tube 29 has elongated in such a manner that the force of the compression spring 37 has caused the lever 36 to pivot on the pivot means 40 in a counterclockwise direction sufficiently to cause the end 49 of the lever 36 to contact against the ball 45 and move the balls 44 and 45 from the position illustrated in FIG. 1 to the position illustrated in FIG. 3 wherein the ball 45 moves in the spring member 53 as illustrated in FIG. 3 so as to be held by the radial friction of the spring member 53 in that fully open position illustrated in FIG. 3 even though the end 49 of the lever begins to move in a clockwise direction away from the ball 45 and toward the ball 44. Thus, the opened valve seat 18 will vent the control pressure interconnected to the inlet 17 through the open valve seat 18 and out through the vent filter 20 at the outlet 19. Should the temperature further increase after the lever 36 has been fully moved in its counterclockwise direction as illustrated in FIG. 3, such as above 1600°F, the spring 42 will maintain the actuator 33 in contact with the end 32 of the rod 28 even though the end 34 of the actuator 33 moves away from the lever 36 and, thus, out of influence of the spring 37. However, when the temperature drops to approximately 1100°F, the tube 29 has contracted sufficiently to cause the rod 28 to move to the left in FIG. 3 and thereby pivot the lever 36 in a clockwise direction so that the end 49 thereof again contacts against the ball 44 and moves the balls 44 and 45 to the left whereby the ball 45 moves in the member 53 to the left side thereof as illustrated in FIG. 1 so that the balls 44 and 45 are placed into sealing engagement with the valve seat 18 to close the same and be held thereagainst by the compression spring 46 in the manner previously described. As the temperature drops below 1100°F, ball 44 becomes the fulcrum point of the lever 36 and spring 37 absorbs the additional motion of the lever 36 as the tube 29 further contracts.

Therefore, it can be seen that by predetermining the sizing of the slot 50, the thickness of the edges 51 and 52 of the lever 36 and the diameter of the balls 44 and 45, a particular desired differential in the condition required for the opening and closing of the valve seat 18 can be provided for the control device 10 of this invention.

Accordingly, it can be seen that this invention not only provides an improved condition responsive valve construction, but also this invention provides an improved method of making such a condition resposive valve construction or the like.

While the form and method now preferred have been disclosed and illustrated as required by the Patent Statute, it is to be understood that other forms and method steps can be utilized and still come within the scope of the appended claims.

What is claimed is:

1. A condition responsive valve construction comprising a housing means having a valve seat, a pair of balls having their respective substantially spherical surfaces secured together in abutting relation and being movable toward and away from said valve seat so that one of said balls acts to open and close said valve seat, a lever movably mounted in said housing means and acting between said balls to cause movement thereof, and condition responsive means carried by said housing means and being operatively associated with said lever to cause movement thereof upon conditions sensed thereby.

2. A condition responsive valve constuction comprising a housing means having a valve seat, a pair of balls having their respective substantially spherical surfaces secured together in abutting relation and being movable toward and away from said valve seat so that one of said balls acts to open and close said valve seat, a lever movably mounted in said housing means and acting between said balls to cause movement thereof, and condition responsive means carried by said housing means and being operatively associated with said lever to cause movement thereof upon conditions sensed thereby, said lever having a part thereof disposed between said balls for acting thereon, said part of said lever having lost motion travel between said balls for creating a differential in the condition required to open and close said valve seat.

3. A valve construction as set forth in claim 2 wherein said part of said lever comprises one end thereof that has a slot passing therethrough and straddles said secured together balls.

4. A valve construction as set forth in claim 1 and including spring means acting on said balls to tend to move said balls in a valve seat closing direction thereof.

5. A valve construction as set forth in claim 4 wherein said spring means acts against the other of said balls.

6. A valve construction as set forth in claim 1 and including means for tending to hold said balls in a valve seat closed position thereof and in a valve seat open position thereof.

7. A valve construction as set forth in claim 6 wherein said means for holding said balls comprises a spring member that acts on one of said balls.

8. A condition responsive valve construction comprising a housing means having a valve seat, a pair of balls having their respective substantially spherical surfaces secured together in abutting relation and being movable toward and away from said valve seat so that one of said balls acts to open and close said valve seat, a lever movably mounted in said housing means and acting between said balls to cause movement thereof, and condition responsive means carried by said housing means and being operatively associated with said lever to cause movement thereof upon conditions sensed thereby, and means for tending to hold said balls in a valve seat closed position thereof and in a valve seat open position thereof, said means for holding said balls comprising a spring member that acts on one of said balls, said spring member acting radially on one of said balls to tend to hold the same in either of said positions of said balls.

9. A condition responsive valve construction comprising a housing means having a valve seat, a pair of balls secured together and being movable toward and away from said valve seat so that one of said balls acts to open and close said valve seat, a lever movably mounted in said housing means and acting between said balls to cause movement thereof, condition responsive means carried by said housing means and being operatively associated with said lever to cause movement thereof upon conditions sensed thereby, and means separate from said lever for tending to hold said balls in said valve seat closed position thereof and in an open position thereof.

10. A valve construction as set forth in claim 9 and including spring means acting on said balls to tend to move said balls in valve seat closing direction thereof, said spring means being separate from said means for tending to hold said balls in said valve seat closed and open position thereof.

11. A valve construction as set forth in claim 9 wherein said means for holding said balls comprises a spring member that acts on one of said balls.

12. A condition responsive valve construction comprising a housing means having a valve seat, a pair of balls secured together and being movable toward and away from said valve seat so that one of said balls acts to open and close said valve seat, a lever movably mounted in said housing means and acting between said balls to cause movement thereof, condition responsive means carried by said housing means and being operatively associated with said lever to cause movement thereof upon conditions sensed thereby, means separate from said lever for tending to hold said balls in said valve seat closed position thereof and in an open position thereof, and spring means acting on said balls to tend to move said balls in a valve seat closing direction thereof, said spring means being separate from said means for tending to hold said balls in said valve seat closed and open position thereof, said spring means acting radially on one of said balls to tend to hold the same in either of said positions of said balls.

13. A valve construction as set forth in claim 12 wherein said spring member is substantially triangular in shape and said one ball is adapted to move in said triangular shape to be radially compressed by said spring member in all positions of said one ball.

14. A method of making a condition responsive valve construction comprising the steps of providing a housing means with a valve seat, securing the respective substantially spherical surfaces of a pair of balls together in abutting relation and disposing the same in said housing means so as to be movable toward and away from said valve seat in such a manner that one of said balls acts to open and close said valve seat, mounting a movable lever in said housing means to act between said balls to cause movement thereof, and operatively associating a condition responsive means with said lever to cause movement thereof upon conditions sensed thereby.

15. A method of making a condition responsive valve construction comprising the steps of providing a housing means with a valve seat, securing the respective substantially spherical surfaces of a pair of balls together in abutting relation and disposing the same in said housing means so as to be movable toward and away from said valve seat in such a manner that one of said balls acts to open and close said valve seat, mounting a movable lever in said housing means to act between said balls to cause movement thereof, operatively associating a condition responsive means with said lever to cause movement thereof upon conditions sensed thereby, disposing a part of said lever between said balls for acting thereon and causing said part of said lever to have lost motion travel between said balls for creating a differential in the condition required to open and close said valve seat.

16. A method of making a valve construction as set forth in claim 15 and including the step of forming said part of said lever at one end thereof with a slot passing therethrough that straddles said secured together balls.

17. A method of making a valve construction as set forth in claim 14 and including the step of disposing a spring means to act on said balls to tend to move said balls in a valve seat closing direction thereof.

18. A method of making a valve construction as set forth in claim 17 and including the step of causing said spring means to act against the other of said balls.

19. A method of making a valve construction as set forth in claim 14 and including the step of providing means for tending to hold said balls in a valve seat closed position thereof and in a valve seat open position thereof.

20. A method of making a valve construction as set forth in claim 19 and including the step of forming said means for holding said balls from a spring member that acts on one of said balls.

21. A method of making a condition responsive valve construction comprising the steps of providing a housing means with a valve seat, securing the respective substantially spherical surfaces of a pair of balls together in abutting relation and disposing the same in said housing means so as to be movable toward and away from said valve seat in such a manner that one of said balls acts to open and close said valve seat, mounting a movable lever in said housing means to act between said balls to cause movement thereof, operatively associating a condition responsive means with said lever to cause movement thereof upon conditions sensed thereby, providing means for tending to hold said balls in a valve seat closed position thereof and in a valve seat open position thereof, forming said means for holding said balls from a spring member that acts on one of said balls, and causing said spring member to act radially on one of said balls to tend to hold the same in either of said positions of said balls.

22. A method of making a condition responsive valve construction comprising the steps of providing a housing means with a valve seat, securing a pair of balls together and disposing the same in said housing means so as to be movable toward and away from said valve seat in such a manner so that one of said balls acts to open and close said valve seat, mounting a movable lever in said housing means to act between said balls to cause movement thereof, operatively associating a condition responsive means with said lever to cause movement thereof upon conditions sensed thereby, and forming means separate from said lever for tending to hold said balls in said valve seat closed position thereof and in a certain open position thereof.

23. A method of making a valve construction as set forth in claim 22 and including the step of disposing spring means to act on said balls to tend to move said balls in valve seat closing direction thereof, said spring means being separate from said means for tending to hold said balls in said valve seat closed and open positions thereof.

24. A method of making a condition responsive valve construction comprising the steps of providing a housing means with a valve seat, securing a pair of balls together and disposing the same in said housing means so as to be movable toward and away from said valve seat in such a manner so that one of said balls acts to open and close said valve seat; mounting a movable lever in said housing means to act between said balls to cause movement thereof, operatively associating a condition responsive means with said lever to cause movement thereof upon conditions sensed thereby, and forming means separate from said lever for tending to hold said balls in said valve seat closed position thereof and in a certain open position thereof, forming said means for holding said balls from a spring member that acts on one of said balls, and causing said spring member to act radially on one of said balls to tend to hold the same in either of said positions of said balls.

25. A method of making a valve construction as set forth in claim 24 and including the step of causing said spring member to act radially on one of said balls to tend to hold the same in either of said positions of said balls.

26. A method of making a valve construction as set forth in claim 25 and including the step of forming said spring member in substantially a triangular shape so that said one ball is adapted to move in said triangular shape to be radially compressed by said spring member in all positions of said one ball.

* * * * *